(12) United States Patent
Aura

(10) Patent No.: US 6,711,400 B1
(45) Date of Patent: Mar. 23, 2004

(54) AUTHENTICATION METHOD

(75) Inventor: Tuomas Aura, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/418,138

(22) Filed: Oct. 14, 1999

Related U.S. Application Data

(63) Continuation of application No. PCT/FI98/00290, filed on Apr. 1, 1998.

(30) Foreign Application Priority Data

Apr. 16, 1997 (FI) .................................................. 971620

(51) Int. Cl.$^7$ ........................... H04M 1/66; H04Q 7/20; H04L 9/00; H04K 1/00
(52) U.S. Cl. ....................... 455/411; 415/433; 713/168; 713/169; 380/255; 380/270
(58) Field of Search ................. 455/411, 433; 380/248, 249, 270, 255; 340/5.26, 5.74, 5.8; 713/169, 168, 170, 200, 171

(56) References Cited

U.S. PATENT DOCUMENTS

| | | | | |
|---|---|---|---|---|
| 5,537,474 A | * | 7/1996 | Brown et al. | 380/248 |
| 5,544,245 A | * | 8/1996 | Tsubakiyama | 713/171 |
| 5,557,654 A | * | 9/1996 | Maenpaa | 455/411 |
| 6,373,949 B1 | * | 4/2002 | Aura | 380/247 |
| 6,438,369 B1 | * | 8/2002 | Huang et al. | 455/417 |

FOREIGN PATENT DOCUMENTS

| | | |
|---|---|---|
| EP | 0651533 | 5/1995 |
| EP | 0673178 | 9/1995 |
| EP | 0675615 | 10/1995 |
| GB | 2279540 | 1/1995 |
| JP | 8018552 | 1/1996 |

\* cited by examiner

*Primary Examiner*—Vivian Chin
*Assistant Examiner*—Yuwen Pan
(74) *Attorney, Agent, or Firm*—Squire, Sanders & Dempsey L.L.P.

(57) ABSTRACT

In telecommunications systems, the traffic can be protected from eavesdropping and the use of a false identity can be prevented by verifying the authenticity of the terminal equipment by means of an authentication procedure. Verifying the authenticity of the terminal equipment is especially important in the mobile communications systems. In the authentication procedure, the network checks the authenticity of the identity stated by the subscriber device. Additionally, the subscriber device can check the authenticity of the network identity. In the systems in accordance with prior art, the secret information required for making the authentication must be transferred via unsecure transfer networks and given to the visited networks. The information makes it possible to make unlimited number of authentications in an unlimited time. In this case, an active eavesdropper may be able to acquire the information and make the authentication process without forming a connection to the subscriber's authentication centre. The invention presents a method in which each individual authentication process is done between the mobile station and the authentication center. This means that the reliability of the network is checked in connection with every authentication, and not enough information is transferred between the network elements to make it possible to use a false identity.

12 Claims, 5 Drawing Sheets

AUTHENTICATION METHOD

This is a continuation of PCT/FI98/00290 filed Apr. 1, 1998.

FIELD OF THE INVENTION

The invention is related to the authentication between subscriber equipment and the network in a telecommunications system. The invention can be applied especially to the authentication methods of a mobile communications system.

BACKGROUND OF THE INVENTION

The purpose of the authentication is to verify the authenticity of the identities of the parties of the data transfer even before forming the telecommunications connection. The authenticity of the parties must be verified in order to ensure the data security of the subscriber. Additionally, authentication can be used to prevent the use of network services by means of another subscriber's identity.

Verifying the authenticity of the identities of the parties is especially important in mobile communications systems in which the subscriber and the network state their identities to each other before forming the connection. If the authenticity of the stated identities is not verified, a connection can be formed by using a false identity simply by giving the identification data of some other mobile subscriber or network. In the circuit-switched systems of a fixed telephone network, the subscriber identity is determined by the subscriber line, so in order to use a false identity, the subscriber line of some other subscriber must be used. In packet-switched systems, the subscriber identity is transferred in each data package sent by the subscriber, so a false identity can be used simply by giving false identification data. Basically, the authenticity of the identity stated by the subscriber can be verified in all systems by using the same kind of authentication methods.

FIG. 1 illustrates a mobile communications network and its network elements related to the authentication. The figure shows two mobile services switching centres MSC1, MSC2 and the visitor location registers VLR1, VLR2 related to them, base station controllers BSC, base transceiver stations BTS, a mobile station MS, a home location register HLR and an authentication centre AUC typically located in connection with the HLR. Mobile services switching centres can form signalling connections to the home location register HLR and to the authentication centre AUC, as shown with dotted lines in the figure.

Each mobile subscriber has a home public land mobile network HPLMN with whose operator the mobile subscriber has signed an agreement and in which the subscriber data is stored. In addition to the home network HPLMN, the mobile subscriber can use the services of public land mobile networks PLMN with which the subscriber's operator has a roaming agreement. The network with which the mobile station communicates is now on called as the visited public land mobile network VPLMN and it can be the home network HPLMN of the mobile station or some other mobile communications network PLMN.

The mobile communications system is connected via the mobile services switching centre MSC to other networks, such as public switched telephone network PSTN or integrated services digital network ISDN. Several base station controllers BSC are connected to the mobile services switching centre MSC. Several base stations BTS are connected to each base station controller BSC. The base stations can form connections to subscriber stations, that is, mobile stations MS comprising mobile equipment ME and subscriber identity modules SIM, via the channels of the so called air interface.

FIG. 2 illustrates an authentication method used in a known GSM system. In the system, the purpose of the authentication is to ensure that the mobile station trying to connect to the network really is what it claims to be. The principle of the authentication procedure is to have the network ask the mobile station a question for which only the mobile station with the given identity can answer correctly. The procedure is based on the use of a subscriber-specific authentication key Ki. During the entry of the subscriber data, the key Ki has been stored in the authentication centre AUC and in the subscriber identity module SIM to be placed in the mobile station. There is no way to find out the key without breaking the subscriber identity module SIM; only the authentication algorithms located in the authentication centre and in the subscriber identity module can use the key.

The authentication method has two stages. At the first stage (FIG. 2, stages 201–203), the authentication centre forms so called authentication triplets and sends them to the network which the mobile station is currently visiting. At the second stage, the network authenticates the mobile subscriber by using the triplets it has received from the authentication centre (stages 204–210).

The forming of the authentication triplets starts with generating a random number RAND by using the random number generator (stage 201). At stage 202, the random number RAND is entered, together with the mobile-subscriber-specific authentication key Ki, to the algorithms A3 and A8. The algorithms A3 and A8 are secret algorithms defined in the Memorandum of Understanding (MoU) of the GSM operators' organisation. Different operators can use different versions of the algorithms. Basically, the algorithms are one-way hash functions $H(K,X)$ with keys and the following applies to them:

1. when K and X have been given, unique $H(K,X)$ is easy to calculate and
2. when X has been given, but the key K is unknown, $H(K,X)$ is impossible, or at least very difficult, to calculate,
3. when a great number of arguments X and the corresponding hash function values $H(K,X)$ have been given, but the key K is unknown, the key K is impossible, or at least very difficult, to calculate and
4. when a great number of arguments X and the corresponding hash function values $H(K,X)$ have been given, but the key K is unknown, the hash function value $H(K,X')$ for given input $X'$ is impossible, or at least very difficult, to calculate, if the value is not known.

In addition to the GSM system algorithms A3 and A8 (which have a secret implementation), known one-way hash functions with keys are, for example, HMAC (Hash-Based Message Authentication Code) algorithms formed from the SHA (Secure Hash Algorithm) and MD5 (Message Digest Algorithm 5) algorithms.

The authentication triplet (RAND, SRES, Kc) formed by the responses SRES (Signed RESponse) and Kc, which are calculated by using the algorithms A3 and A8, and the random number RAND used as input data, are sent to the network VPLMN which the mobile station is visiting at the given time. It should be noted that VPLMN can also be the subscriber's home network HPLMN. Due to the features of the algorithms A3 and A8, the subscriber authentication key Ki cannot be deduced even on the basis of a large number of known triplets (RAND, SRES, Kc). In the network, the triplets are stored in the visitor location register VLR. Typically, several triplets, for example, ten, are calculated and sent to VLR at a time.

When a connection is being formed between the mobile station and the network, the network authenticates the mobile station by using the triplets received from the authentication centre. The network starts the authentication at stage 204 by sending an authentication request to the mobile station. The request contains the random input RAND belonging to the triplet. The mobile station receives the request and, at stage 205, calculates the values SRES' and Kc by using the algorithms A3 and A8, programmed in the subscriber identity module SIM, and by using the random number RAND and the authentication key Ki, programmed in the subscriber identity module SIM, as the input. On the basis of the features of the algorithms, SRES'=SRES only, if the authentication keys Ki used by both the authentication centre and the subscriber identity module are identical.

The mobile station sends the calculated response for algorithm A3, SRES', to the network which compares it to the response SRES taken from the authentication triplet at stage 206. If SRES=SRES', the network accepts the mobile station authentication and forms a connection with it. The connection can be defined to use ciphering, which is done by using the response Kc of the algorithm A8 as the key. As the key Kc is not sent via the air interface, an active eavesdropper cannot break the ciphering or, at least, it is difficult. The breaking of the ciphering can be made more difficult by making the authentication often, for example, in relation to every forming of a connection.

As it is virtually impossible to deduce the key Ki by listening to the authentications of a mobile station, a passive eavesdropper cannot decipher the connection nor is it possible to pretend to be the mobile subscriber by actively changing the messages.

In the above described method, only the mobile station is authenticated. So the mobile communications network is assumed to be reliable. However, eavesdroppers may use their own base station which blocks the signals from the base stations of the real mobile communications network and which is connected, for example, to the fixed telephone network. By using this base station, an eavesdropper may send the authentication input RAND to a mobile station and receive SRES' as a response. The mobile station cannot detect the falsity of the base station, but assumes that the authentication succeeded. Later, the base station directs the mobile station not to use ciphering; after that it is easy to listen to the traffic of the mobile station. Alternatively, the eavesdropper may use an authentication triplet acquired by honest or dishonest means, pretend to be a base station and decipher the connection by using a key contained in the triplet. Triplets can be acquired by, for example, all of the GSM operators which have a roaming agreement with the subscriber's home network; the validity or re-use of the triplets is not limited in any way.

To solve this problem, algorithms authenticating the network have also been developed for systems which require eavesdropping by means of a separate base station to be prevented. An example of this kind of an algorithm is the algorithm used in the TETRA system and illustrated in FIG. 3. The algorithm uses the mobile subscriber authentication key Ki. The authentication centre generates (stage 301) the random number RS and uses it and the authentication key Ki to calculate keys KS and KS' by using the algorithms TA11 and TA21 (stages 302 and 303). It sends the created triplet (RS,KS,KS') to the base station BS.

The base station generates the random number RAND1 (stage 311) and sends the random numbers RAND1 and RS to the mobile station. The mobile station calculates keys KS and KS' on the basis of the random number RS and its own key Ki by using the algorithms T11 and T21 (stages 321 and 322). If the authentication centre and the mobile station use the same key Ki, they both have the same values KS and KS' at this point.

At stage 323, the mobile station uses the algorithm TA12 to calculate in the subscriber identity module SIM the variables RES1 and DCK1 by using the keys KS and the random number RAND1. So, RES1 and DCK depend on the subscriber-specific key Ki and the random numbers RS and RAND1 generated in the authentication centre and the base station. At stage 324, the mobile station generates a new random number RAND2 and sends it and the calculated value RES1 to the base station. Correspondingly, the base station calculates the corresponding variables XRES1 and DCK1 by using the algorithm TA12 at stage 312. If XRES1=RES1, the base station can assume that the mobile station has the same key Ki as the authentication centre. On the basis of this, the network knows that the mobile station is what it claims to be. As the network has been able to find out that the mobile station has the same key Ki as the authentication centre and, thus, the same key KS as the network, it can now rely on both having the same value for the variable DCK1. This means that at stage 313, the value of the truth-variable R1, which shows the success of the mobile station authentication, is R1=true. If this is not the case, R1 is false.

The mobile station authenticates the network by sending the input RAND2. At stage 314, the responses RES2 and DCK2 are calculated in the base station on the basis of inputs KS' and RAND2 by using the algorithm. TA22. Correspondingly, the same algorithm TA22 and the same inputs KS' and RAND2 are used to calculate responses XRES2 and DCK2 in the mobile station. RES2, XRES2 and DCK2 depend on the subscriber-specific key Ki and the random numbers RS and RAND2 generated in the authentication centre and in the mobile station. The base station sends the calculated value RES2 to the mobile station together with the truth-value R1. If the base station and the mobile station both have the same keys KS', then XRES2=RES2. If this is true, the mobile station knows that the base station has got the value KS' from the authentication centre AUC and, thus, it considers the network reliable. Additionally, the mobile station can assume that the base station has the same key DCK2 as the mobile station itself. As the base station has also stated than R1=true, the mobile station knows that they both have the same keys DCK1. In this case, the variable R2, which is returned by the mobile station to the network and which shows the success of the authentication, gets the value true. After receiving the information R2=true, also the base station knows that they both now have the same keys DCK1 and DCK2.

Finally, at stages 327 and 315, the mobile station and the network calculate the cipher key DCK for the connection on the basis of variables DCK1 and DCK2. So DCK is dependent on the key Ki and the random numbers RS, RAND1 and RAND2. If the mixing of keys of different sessions is not possible, both the mobile station and the base station know, on the basis of the description above, that they both have the same key DCK which can be successfully used for ciphering the connection.

In the described method the keys Ki, KS, KS', DCK1, DCK2 and DCK are never transferred via the air interface, so an eavesdropper cannot decipher the connection or pretend to be the mobile station, if the keys (except Ki) are changed often enough. The mobile station can also be sure that the base station has got its authentication variables RS, KS and KS' from the authentication centre of the mobile subscriber. However, it cannot be sure that the network is not using variables that have been used before. If the authentication centre AUC has trusted the base station BS once and sent it a triplet (RS, KS, KS'), the BS can always use this triplet to show that the AUC trusts it. This leaves an eavesdropper the possibility of somehow acquiring one authentication variable triplet (RS, KS, KS'), which can be used several times.

Thus, the methods in accordance with the prior art cannot guarantee for the mobile station that the base station, which the mobile station is connecting to, is reliable. The objective of the invention is to create a method, which can solve this problem in the prior art. This objective can be achieved with the method described in the independent patent claims.

SUMMARY OF THE INVENTION

The idea of the invention is to perform the authentication as a two-way connection between the subscriber station and the authentication centre by using secret ciphering keys. In this case the network, which the subscriber station is connected to, cannot make the authentication independently and the mobile station can always be sure that the network authentication is reliable.

In the method of the invention, the subscriber station and the authentication centre both generate and send a random number input to each other. On the basis of the random number input generated by themselves and received from the other party via the network, the subscriber station and the authentication centre calculate the responses by using at least two pre-defined functions. Additionally, the authentication centre can verify the reliability of the network by using a separate authentication method, if necessary. The response for the first function, calculated in the authentication centre, is sent to the mobile station. The subscriber station compares the calculated response for the first function to the value received from the network and if the values are the same, it considers the network reliable. The subscriber station sends the calculated response for the second function to the network. The second responses calculated in the subscriber station and in the authentication centre are compared to each other in some suitable network element. The checking can be done, for example, in the network which the subscriber station is connected to or in the authentication centre. The traffic in the connection is preferably ciphered after successful authentication by using a ciphering key calculated in the subscriber station and in the authentication centre by using a third function.

In accordance with one embodiment of the invention, the subscriber identity is never transferred as such via a transfer network and a possible air interface. In this case the identity is ciphered so that the network can, on the basis of the ciphered identity, route the messages concerning the subscriber to the subscriber's home network where the identity is deciphered.

BRIEF DESCRIPTION OF THE FIGURES

The invention is described more closely with reference to the accompanying drawings, in which.

DETAILED DESCRIPTION OF THE INVENTION

The following describes the invention by using a mobile communications system as an example. However, the scope of the invention is not limited to the authentication procedure used in mobile communications systems, but it can also be used in fixed network systems.

Figure 1:
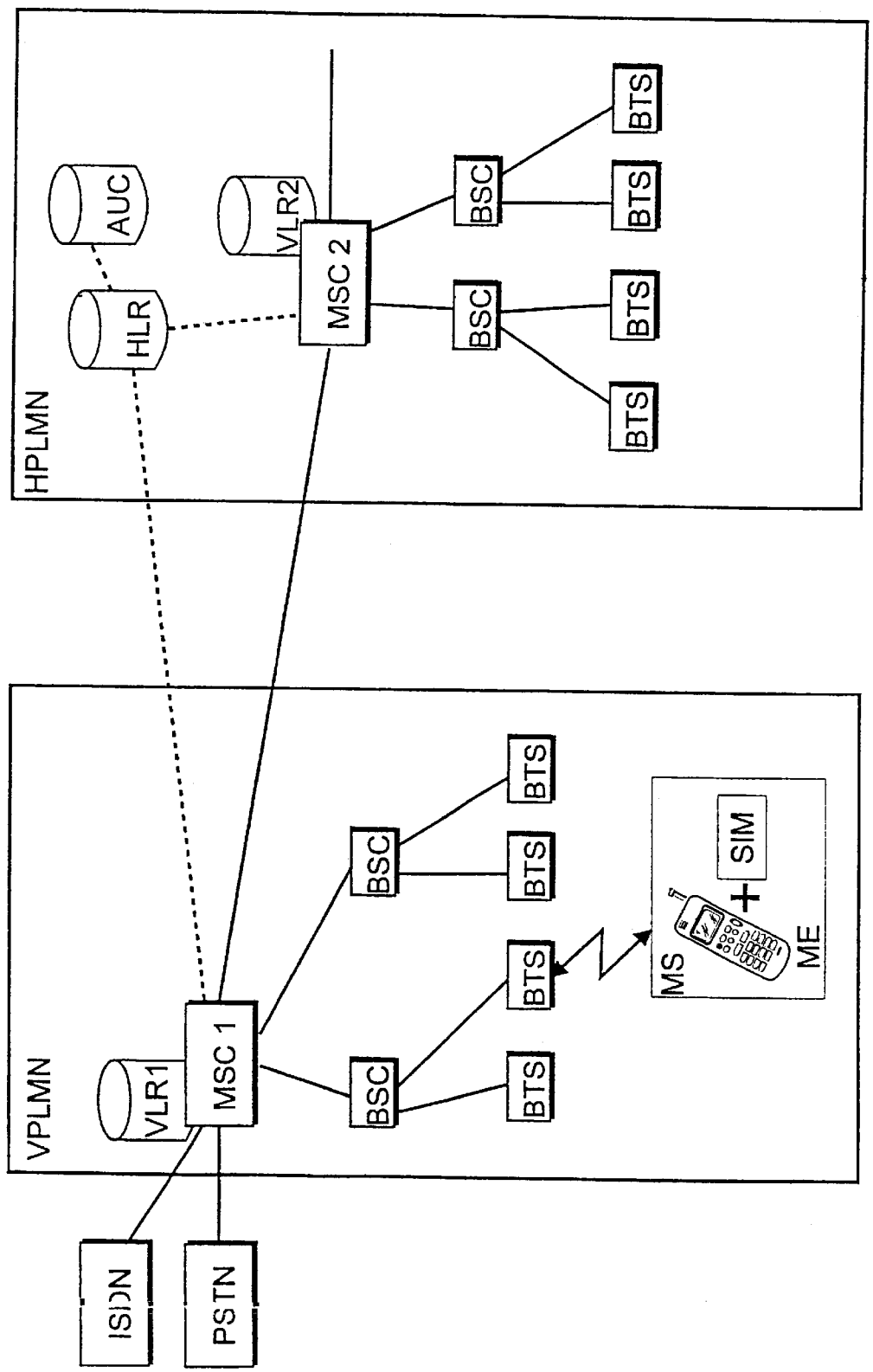
FIG. 1 illustrates the structure of a mobile communications system and the network elements concerned in the authentication.
Figure 2:
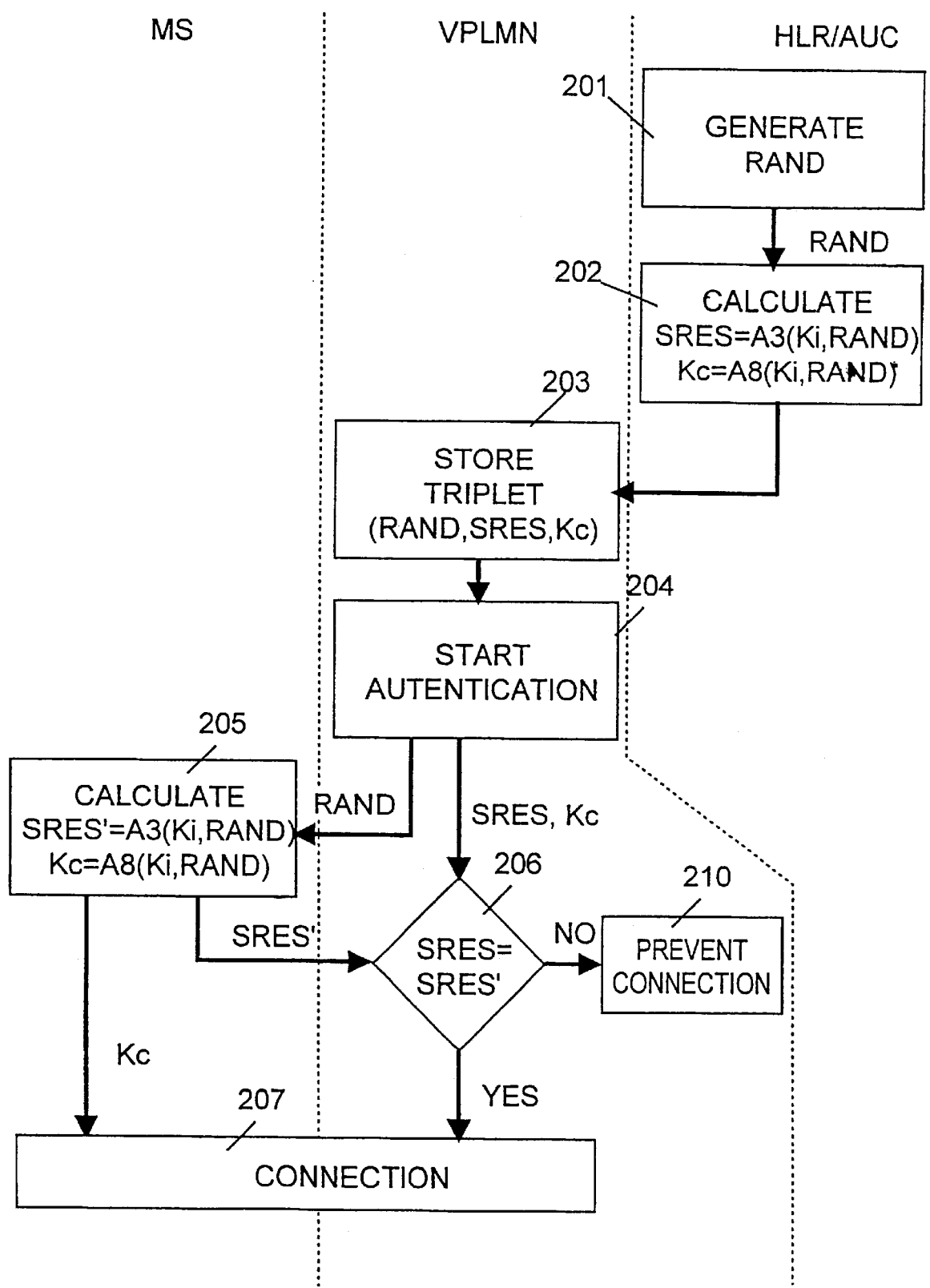
FIG. 2 illustrates a known authentication method of the GSM system.
Figure 3:
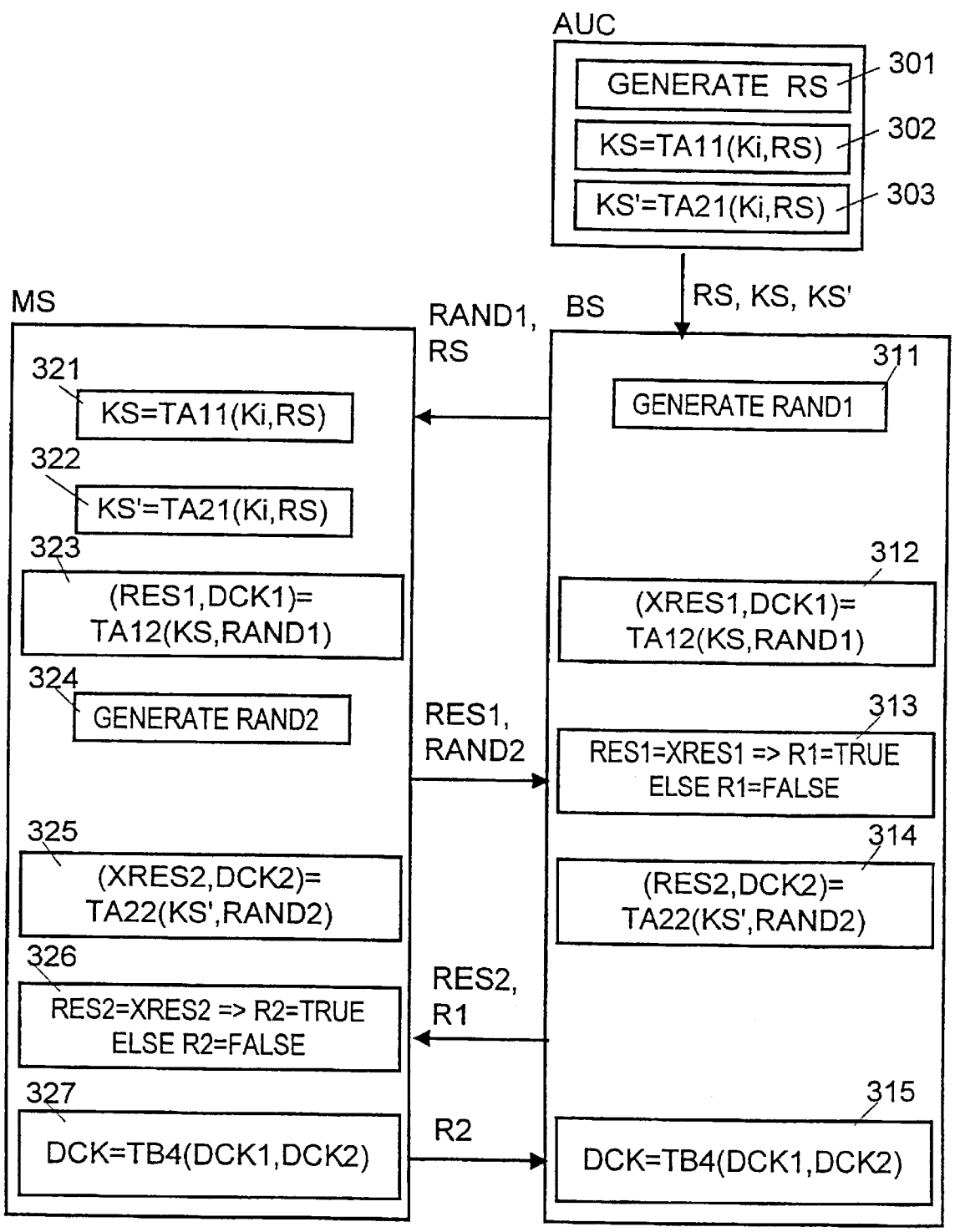
FIG. 3 illustrates a known authentication method of TETRA system.
Figure 4:
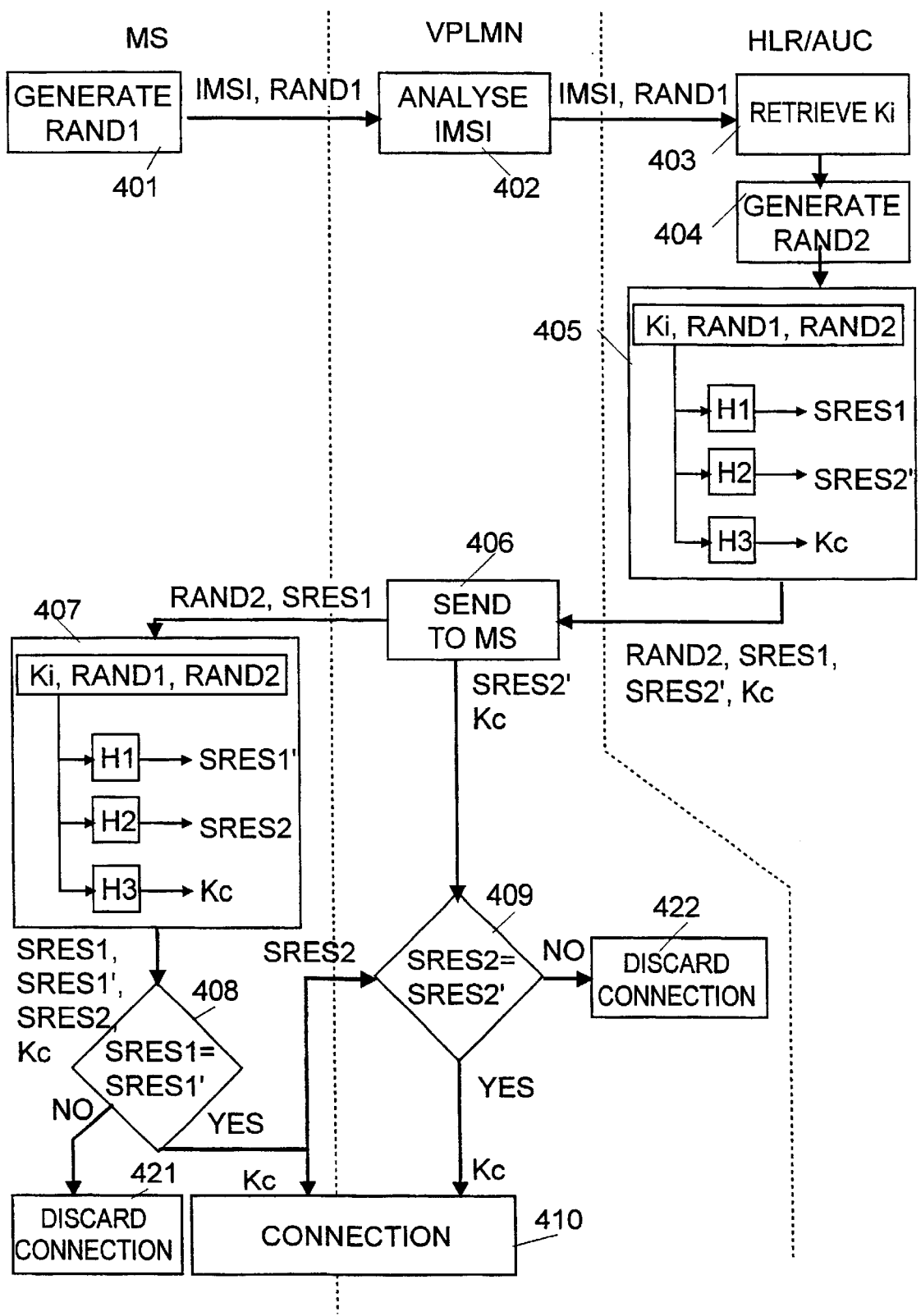
FIG. 4 illustrates the authentication method according to the invention.

Operation of the authentication method in accordance with the invention is illustrated in FIG. 4. The authentication starts either when activated by the mobile station (comprising subscriber equipment ME and subscriber identity module SIM) or as a response to an authentication request received from the network. At stage 401, the mobile station generates a random number RAND1, and sends its international mobile subscriber identity IMSI along with the random number to the network VPLMN. At stage 402, the mobile services switching centre of the network analyses, on the basis of the identity sent by the mobile station, the identity of the authentication centre AUC of the mobile station and sends the message (IMSI, RAND1) sent by the mobile station to the authentication centre.

After receiving the message (IMSI, RAND1), the home location register HLR forwards it to the authentication centre AUC. At this point, the authentication centre can verify that the network VPLMN is what it claims to be, by using some known method to authenticate the network element that sent the message. At stage 403, the AUC uses the identifier IMSI to search its database for the mobile subscriber's cipher key Ki. At stage 404 it generates the random number RAND2. The authentication key Ki and the random numbers RAND1 and RAND2 are entered at stage 405 as the starting data for the one-way hash functions H1, H2 and H3, which provide the keys SRES1=H1(Ki, RAND1, RAND2), SRES2'=H2(Ki, RAND1, RAND2) and Kc=H3(Ki, RAND1, RAND2).

Algorithms H1, H2 and H3 are one-way hash functions H(K,X1,X2) with keys, for which the following is true:

1. when K, X1 and X2 have been given, unique H(K,X1,X2) is easy to calculate and
2. when X1 and X2 have been given, but the key K is unknown, H(K,X1,X2) is impossible, or at least very difficult, to calculate,
3. when a great number of argument pairs X1,X2 and the corresponding hash function values H(K,X1,X2) have been given, but the key K is unknown, the key K is impossible, or at least very difficult, to calculate and
4. when a great number of argument pairs X1,X2 and the corresponding hash function values H(K,X1,X2) have been given, but the key K is unknown, the hash function value H(K,X1',X2') for given pair X1',X2' is impossible, or at least very difficult, to calculate, if the value is not known.

Algorithms H1, H2 and H3 can be implemented, for example, by using the same kind of methods as for the algorithms A3 and A8 (with a secret implementation) of the GSM system. They can also be formed by using a known one-way hash function with a key, such as SHA-HMAC (Secure Hash Algorithm—Hash-based Message Authentication Code), by initialising the hash function to be used with a different constant in each of the cases H1, H2 and H3.

The authentication centre sends the generated random number RAND2 and the results SRES1, SRES2' and Kc of the hash functions to the network VPLMN. The network receives the message and, at point 406, sends the values RAND2 and SRES1 to the mobile station and stores the values SRES2' and Kc for later use.

The mobile station receives the values RAND2 and SRES. Additionally, it has the random number RAND1 it has generated and, for example, the cipher key Ki stored in the subscriber identity module SIM. It enters. these data at point 407 to the algorithm stored in the subscriber module SIM in which the mobile station calculates the values SRES1, SRES2 and Kc by using equations $$SRES1'=H1(Ki, RAND1, RAND2),$$

$$SRES2=H2(Ki, RAND1, RAND2) \text{ and}$$

$$Kc=H3(Ki, RAND1, RAND2)$$

and by using the same hash functions H1, H2 and H3 that the authentication centre used at stage 405.

The mobile station compares the response SRES1 for the function H1 received from the network to the value SRES1' it has calculated itself. If the values are the same, the mobile station has successfully identified the network. After successful identification, the mobile station sends the calculated response SRES2 for function H2 to the network and accepts Kc as the connection-specific cipher key. In practice, due to the features of the hash function H2, SRES1=SRES1' only, if both the authentication centre AUC and the mobile station MS have used the same values RAND1, RAND2 and Ki as inputs of the function H2. Of these, RAND1 and RAND2 have been transferred via the transfer network and an active eavesdropper may have got them. However, the authentication key Ki can only be accessed in the mobile station and in the authentication centre, so an eavesdropper cannot find it out. Because of this, it is clear that if SRES1=SRES1', SRES1 must have been calculated in the authentication centre of the subscriber's network, which the subscriber considers reliable.

The authentication centre can be made responsible for ensuring that it sends the authentication data RAND2, SRES1, SRES2' and Kc only to networks considered reliable. This reliability is checked in connection with every authentication. Thus, when the condition SRES1=SRES1' is true, it implicates to the mobile station that the network is reliable. As a response to stating the reliability of the network, the mobile station is ready to start connection by using the connection-specific cipher key Kc.

Correspondingly, the network VPLMN visited by the subscriber receives the response SRES2 for the hash function H2 from the mobile station and compares it to the value SRES2' it has received from the authentication centre at stage 409. Alternatively, the comparison at stage 409 can be made in the subscriber's home network HPLMN or in the authentication centre AUC. Because the mobile station gets the same response for the function H2 as the authentication centre AUC by using the random numbers RAND1 and RAND2 only, if both have the same subscriber cipher key Ki, the fact that SRES2=SRES2' is true implicates to the network VPLMN that the mobile station is reliable. Additionally, both the network and the mobile station know that they have the same cipher keys Kc.

Because of the features of the hash functions H1, H2 and H3, the network VPLMN or an eavesdropper listening to the network connections cannot use the information RAND1, RAND2, SRES1, SRES2 and Kc, which they can get, to deduce the subscriber's authentication key Ki. Thus, the visited network VPLMN or the eavesdropper cannot learn to independently give correct responses SRES1(Ki, RAND1, RAND2), SRES2(Ki, RAND1, RAND2) and Kc(Ki, RAND1, RAND2) for the random number RAND1 generated by the mobile station. Based on this, an active eavesdropper cannot learn, by listening to the line, to authenticate acceptably to the mobile station by using a false identity.

An eavesdropper who uses a separate base station set up for eavesdropping can, after successful authentication between the network and the mobile station, still pretend to be a base station, block the signal of the reliable base station and direct the connection not to use ciphering. The mobile station can prevent this by refusing to use unciphered connections.

In the above-described algorithm in accordance with the invention, the responses SRES1 and SRES2 depend both on the random input RAND1 generated in the mobile station and on the random input RAND2 generated in the authentication centre. In the TETRA system algorithm, presented at the beginning of this application, the authentication responses RES1 and RES2 both depend only on one of the numbers: the number RAND1 generated in the network or the number RAND2 generated in the mobile station, RES1= RES1(RAND1) or RES2=RES2(RAND2). In this case, when using several parallel connections, it may happen that the authentication inputs from different connections are mixed up, so that the authentication succeeds, but the different parties get different cipher keys DCK. This means that the receiver of the message cannot decipher it and the data transfer in the connection fails. In the above-described algorithm in accordance with the invention, the responses SRES1 and SRES2 depend on both connection-specific random numbers RAND1 and RAND2, that is, SRES1= SRES1(Ki, RAND1, RAND2) and SRES2=SRES2(Ki, RAND1, RAND2). In this case, the keys of, the different connections cannot be mixed up even when there are several parallel connections. Of course, this feature has no relevance to the security of the ciphering of the connection, but it does have a meaning when planning implementation of protocols that use several parallel connections.

The authentication method illustrated in FIG. 4 verifies the reliability of the network. With this method, there is still the problem that the subscriber's identity information IMSI must be transferred via an unsecure channel, especially as regards the air interface, and in unciphered format to the authentication centre. The problem can be made less severe by using a temporary identity TMSI assigned by the network to the mobile station in accordance with prior art. In this case, however, if the network or the mobile station loses data, the first connection after this must always use the original identifier IMSI.

Figure 5:
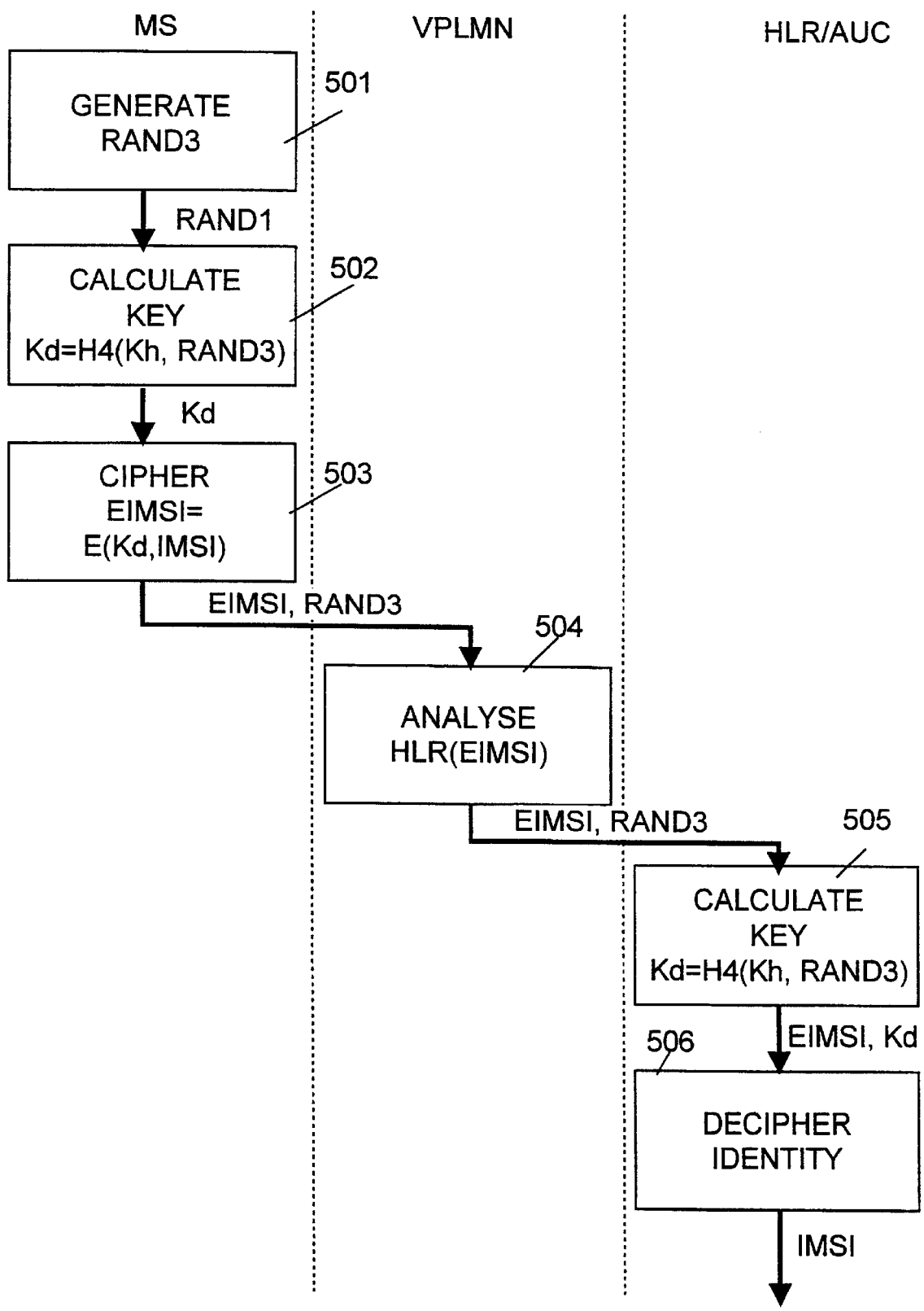
FIG. 5 illustrates the identity transfer method that protects the subscriber identity.

The problem of revealing the identity can be solved by using the algorithm illustrated in FIG. 5 for ciphering the identity IMSI. In the algorithm in FIG. 5, the mobile station first generates at stage 501 the random number RAND3, which can be, for example, the same random number RAND1 used in the authentication algorithm illustrated in FIG. 4. At stage 502, the mobile station generates the cipher key Kd by using a one-way hash function H4 with keys. As the input of the function are used the random number RAND3 and the HLR-specific key Kh programmed in the subscriber identity module SIM.

At stage 503, the mobile station ciphers its identity information IMSI by using the key Kd and its identity information IMSI as the input for the ciphering algorithm E, and sends the ciphered identity and the random number RAND3 to the network VPLMN. The network receives the message. In order to be able to send the subscriber's message to the correct home location register, the network must be able to analyse the address of the subscriber's home location register on the basis of the message. For this, it is advantageous to use the E algorithm as the ciphering algorithm, because it leaves the part of the identity data, that specifies the subscriber's HLR, unciphered. The subscriber's identity data IMSI is typically of the format IMSI=HLR address+ data identifying the subscriber within the HLR. The ciphering algorithm must retain the HLR address in its original format and cipher only the data identifying the subscriber within the HLR.

After analysing the received message for the subscriber's home location register address, the network sends a message containing the ciphered identity data EIMSI and the random number RAND3 to the home location register HLR. At stage 505, the HLR calculates the cipher key Kd by using the key Kh it knows and the random number RAND3 it has received from the mobile station. At stage 506, the HLR deciphers the subscriber IMSI by using the cipher key Kd and the ciphered identity EIMSI sent by the mobile station.

Because the key Kh is known only to the mobile station and its home location register, an eavesdropper listening to the traffic between the mobile station and its home location register cannot determine the identity of the subscriber. An eavesdropper can determine the subscriber's home location register address, but cannot determine the exact identity of the subscriber within the home location register, which can typically contain hundreds of thousands of subscribers.

The cipher key Kh does not need to be the same for all of the mobile subscribers in the home location register. However, in that case the home location register must be able to determine the used key Kd from the message sent to the network by the mobile station. This can be implemented, for example, by dividing the subscribers in the home location register into groups within which the same key is used and by including the group identifier in the message sent to the network by the mobile station. This can be done, for example, by forming the groups on the basis of the first number of the subscriber part of the identification data IMSI and by transferring the first number of the subscriber part of the identity data unciphered. This makes the deciphering of the key Kh even more difficult, because successful deciphering of one key does not mean anymore that the protection of the identities of all the subscribers in that network could be deciphered. On the other hand, the part of the identity data to be sent unciphered increases and, thus, the group into which the subscriber can be determined to belong on the basis of the (partly) ciphered identity data without deciphering the data, becomes smaller.

The ciphering can also be done for subscribers, whose home network HPLMN has several home location registers, also in such a way that the ciphered identifier EIMSI can only be used to determine the subscribers home network. In this case the messages identified by using the subscriber's ciphered identity are, routed to a certain home location register HLR in the home network and this HLR has been defined to make the deciphering.

Even though the above-described examples of the embodiments of the invention describe the invention in relation to a mobile communications system, the invention is not limited only to the authentication procedures of a mobile communications network. The method can as well be used for authenticating the parties of a connection in a fixed network. What is essential for the invention is that each subscriber has an authentication centre into which has the authentication keys used by the subscriber.

The method of the invention can be used, in addition to the authentication preceding a telecommunications connection, for example, for road toll systems in which the authentication does not lead into a telecommunications connection, but triggers a payment transaction. In this case the method in accordance with the invention can be used to prevent the monitoring of the subscriber's movements by using a false base station in the road toll system.

Using a separate subscriber identity module SIM is not essential for the invention, as the required algorithms and subscriber-specific keys used in the authentication method can just as well be stored in the subscriber equipment.

What is claimed is:

1. A method for authenticating both a subscriber station and a communications network to establish a communication connection, the subscriber station having its own identity data, the method comprising:

generating a first random number in the subscriber station which is transferred along with the subscriber identity data to an authentication centre;

generating a second random number in the authentication centre which is transferred to the subscriber station, calculating a first set of parameters in the authentication centre having first and second responses and calculating a second set of parameters in the subscriber station including first and second responses, wherein both sets of parameters are defined on the basis of the subscriber identity and at least one of said random numbers;

sending the first responses of the first set of parameters to the subscriber station;

comparing the first responses in the subscriber station, wherein if the first responses are equal then the communications network is authenticated by the subscriber station;

sending the second responses of the second set of parameters to the communications network;

comparing the second responses in the communications network, wherein if the second responses are equal then the subscriber station is authenticated by the communications network, in which the home network has been defined for at least some subscribers, wherein the identity data is divided into first and second parts in such a way that the first part contains the information for identifying the subscriber group and the second part identifies the subscriber within the subscriber group, a third random number is generated in the subscriber station, the second part of the subscriber identifier is ciphered by using a random input and a subscriber group specific key, a message containing a partially ciphered identifier, consisting of the first part and the ciphered second part, and the used random input is sent to a network element of the communications network, the message is routed from the communications network to the subscriber's home network and the identity is deciphered in the subscriber's home network.

2. A method according to claim 1, wherein a third response, based on the subscriber identity and the random numbers is calculated both in the authentication centre and in the subscriber station, and this response is used as a cipher key in communications between the subscriber station and the communications network.

3. A method according to claim 1, wherein the second responses are compared in a network element belonging to the home communications network.

4. A method according to claim 1, wherein the second responses are compared in the authentication centre.

5. A method according to claim 1, wherein both the first and the second random numbers are used in defining the first and the second response.

6. A method according to claim 1, wherein the subscriber station is a mobile station of a mobile communications system and the communications network is a mobile communications network.

7. A method according to claim 1, in which the subscriber identity data comprises a part defining the subscriber's home network and a part identifying the subscriber within the home network, wherein a subscriber group is a group of subscribers in one home network and the ciphered part of the identity data is the part of the identification data that defines the subscriber's identity in the home network.

8. A method according to claim 1, in which the subscriber identity data comprises a part defining one home location register and a part identifying the subscriber within the home location register, wherein a subscriber group is a group of subscribers in one home location register and the ciphered part of the identity data is the part of the identification data that defines the subscriber's identity in the home location register.

9. A method according to claim 1, in which the subscriber identity data comprises a part defining the subscriber group of one home location register and a part identifying the subscriber within the subscriber group, wherein the subscriber group is a defined subscriber group within one home location register and the ciphered part of the identity data is the part that defines the subscriber identity within the subscriber group.

10. A method according to claim 1, wherein the same random number generated by the subscriber station is used both for ciphering the identity and authenticating the identity.

11. A method according to claim 1, wherein the subscriber station subscribes to a home communication network which includes the at least one authentication centre and which is different to the communications network.

12. A method according to claim 1, wherein if either the subscriber station or the communications network are not authenticated, a communication connection is not established.

* * * * *